United States Patent
Bandholz (10) Patent No.: US 7,248,979 B2
(45) Date of Patent: Jul. 24, 2007

(54) APPARATUS EMPLOYING PREDICTIVE FAILURE ANALYSIS BASED ON IN-CIRCUIT FET ON-RESISTANCE CHARACTERISTICS

(75) Inventor: Justin Potok Bandholz, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/124,940

(22) Filed: May 9, 2005

(65) Prior Publication Data

US 2006/0265158 A1 Nov. 23, 2006

(51) Int. Cl.
G01R 27/00 (2006.01)

(52) U.S. Cl. ........................................ 702/65

(58) Field of Classification Search ................ 702/57, 702/64, 65
See application file for complete search history.

(56) References Cited

U.S. PATENT DOCUMENTS

| | | |
|---|---|---|
| 4,306,185 A | 12/1981 | Leuschner |
| 4,678,984 A | 7/1987 | Henze |
| 4,719,531 A | 1/1988 | Okado et al. |
| 5,119,265 A | 6/1992 | Qualich et al. |
| 5,384,529 A | 1/1995 | Nakago |
| 5,617,038 A | 4/1997 | Houston |
| 5,654,896 A * | 8/1997 | Ochi .......................... 716/4 |
| 5,999,466 A | 12/1999 | Marr et al. |
| 6,049,899 A | 4/2000 | Auclair et al. |
| 6,191,964 B1 | 2/2001 | Boylan et al. |
| 6,348,806 B1 | 2/2002 | Okandan et al. |
| 6,965,838 B1 * | 11/2005 | Bandholz .................... 702/65 |

* cited by examiner

Primary Examiner—Michael Nghiem
(74) Attorney, Agent, or Firm—John Biggers; Cynthia S. Byrd; Biggers & Ohanian, LLP (57) ABSTRACT

A computing system includes a semiconductor which sources/sinks current to/from components within the system, an in-circuit semiconductor on-resistance characterization circuit which measures the on-resistance of the semiconductor, and a processor which periodically or continuously engages the characterization circuit over the life of the semiconductor to obtain a series of on-resistance measurements. Depending on the type of semiconductor used, or depending on arbitrary design limitations, the computing system predicts semiconductor failure based on either a relative mode or an absolute mode. The relative mode is useful when using FET's since on-resistance values vary significantly. In the relative mode, an optional NVRAM is used to store one or more on-resistance measurements which may serve as a reference for assuring proper circuit operation within tolerable deviations from the reference. In the absolute mode, one or more optional thresholds are utilized to assure that circuit operation remains in a known good region.

17 Claims, 4 Drawing Sheets

APPARATUS EMPLOYING PREDICTIVE FAILURE ANALYSIS BASED ON IN-CIRCUIT FET ON-RESISTANCE CHARACTERISTICS

CROSS-REFERENCE TO RELATED APPLICATIONS

The present application is related to commonly assigned, application Ser. No. 10/855,122, now U.S. Pat. No. 6,965,838, having common inventorship, filed May 27, 2004, and entitled "Apparatus Having In-circuit FET On-resistance Characterization." The related application is hereby incorporated by reference herein in its entirety.

BACKGROUND OF THE INVENTION

This invention pertains to high availability computing systems and other systems which are able to benefit from predictive failure analysis and, more particularly, to a computer system which predicts the failure of a circuit in the system based on on-resistance values which are derived while the system is fully operational.

High availability systems require a minimum of downtime. Any scheduled downtime is used to update system components which cannot be updated during normal system operation such as BIOS, operating system patches, and low-level drivers. As such, even scheduled downtime requires a fully operational system.

With high availability systems, unscheduled downtime is to be avoided or eliminated. The worst types of unscheduled downtime are caused by catastrophic failure of system components. These types of failures have the capability to produce the longest unscheduled downtimes where replacement parts are not readily available.

Current carrying semiconductors, particularly FET's used in power circuits, are apt to fail without warning causing unscheduled downtime and possibly even further circuit damage. Semiconductor failures are caused by a variety of conditions including: contact degradation, contact migration, die corrosion, die scratches, dielectric breakdown, electromigration, electrical overstress, electrostatic discharge, gate oxide breakdown, hot carrier effects, junction burn-out, metal burn-out, mobile ionic contamination, oxide breakdown, and silicon breakdown. Many of these conditions are interdependent and cause the semiconductor to fail as either an open circuit or as a short circuit. For example, contact migration refers to the diffusion of the metal atoms, usually aluminum, from a metal layer into the silicon substrate. This phenomenon is due to the natural occurrence of interdiffusion between two different interdiffusible materials in contact with each other. This phenomenon of interdiffusion occurs in both directions: aluminum diffuses into the silicon and silicon into the aluminum. Where aluminum diffuses into silicon, a condition known as junction spiking occurs which causes a short circuit. Where silicon diffuses into the aluminum and has entirely penetrated the aluminum layer, the reverse, an open circuit results due to voids in the metal contact.

Computing systems today combat failures by including multiple redundant components in a system. If a primary device fails, a secondary device takes over. This redundancy increases the cost and size of a particular design.

SUMMARY OF THE INVENTION

What are needed, therefore, are apparatus and methods which are able to predict that a semiconductor is likely to fail and report such likelihood to the system prior to the failure. The predictive failure report can be used by a system administrator or by an autonomic system to procure replacement parts and replace them prior to the failure.

Additionally, what are needed are apparatus and methods which additionally isolate a failure before the failure is able to do additional circuit damage. In cases where predicting failure is not possible, quickly isolating the failure is equally important.

It has been discovered that the aforementioned challenges are addressed using a system and method which monitor the on-resistance of a semiconductor over a period of time. The time period of interest preferably corresponds to the life of the semiconductor or over as large of a time span as practical in a given design or scenario. Other time periods are accommodated. The monitored semiconductor is typically a semiconductor which either sources or sinks current to or from components of an apparatus. The on-resistance is measured in-circuit during normal operations of the apparatus, thus minimizing downtime. The apparatus and method predict that the semiconductor is likely to fail based on the monitored on-resistance and report a predictive failure to the apparatus based on the prediction.

In one embodiment, the prediction is made by comparing a recent on-resistance value to a stored on-resistance value and determining that the recent on-resistance value exceeds an allowable deviation from the stored on-resistance value. These recent and stored on-resistance values are the values produced by the monitoring.

In one embodiment, the stored on-resistance value is the earliest value of on-resistance stored which corresponds to the semiconductor. The earliest value stored can correspond to, for example, the first time the specific semiconductor is used in the system. Or, if change in on-resistance over a predetermined period of time is of interest for a specific type of semiconductor, the earliest value stored can correspond to a specific integration period such as a predetermined period of hours, days, weeks, months, or years. The earliest value stored can correspond to practical aspects, such as the life of the NVRAM or the life of the lithium battery if one is used.

In one embodiment, the reporting includes reporting a plurality of predictive failures based on a plurality of allowable deviations from the stored on-resistance value.

In one embodiment, the plurality of predictive failures include a warning level reported in response to exceeding a first allowable deviation, and a shutdown level reported in response to exceeding a second allowable deviation which is greater than the first allowable deviation. The shutdown level is optionally accompanied by a disablement of a circuit in the apparatus.

In one embodiment, the prediction is made by comparing a recent on-resistance value to a predetermined threshold and determining that the recent on-resistance value exceeds the predetermined threshold.

In one embodiment, the reporting includes reporting a plurality of predictive failures based on a plurality of predetermined thresholds. The plurality of predictive failures can include a warning level reported in response to exceeding a first threshold, and a shutdown level reported in response to exceeding a second threshold which is greater than the first threshold. The shutdown level is accompanied by a disablement of a circuit in the apparatus.

On-resistance values, as used throughout this specification, are presumably but not necessarily ohmic values. In any case, they may be values which correspond to on-resistance values or are a function of on-resistance or are related to on-resistance. For example, on-resistance may be measured and/or stored in NVRAM as a voltage at a presumed current. Additionally, values can be coefficients, percentages, etc., which are then converted to related values by a processor or used directly.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, in which like numerals indicate like elements or steps throughout the several views, a preferred embodiment of the present invention will be described. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1:
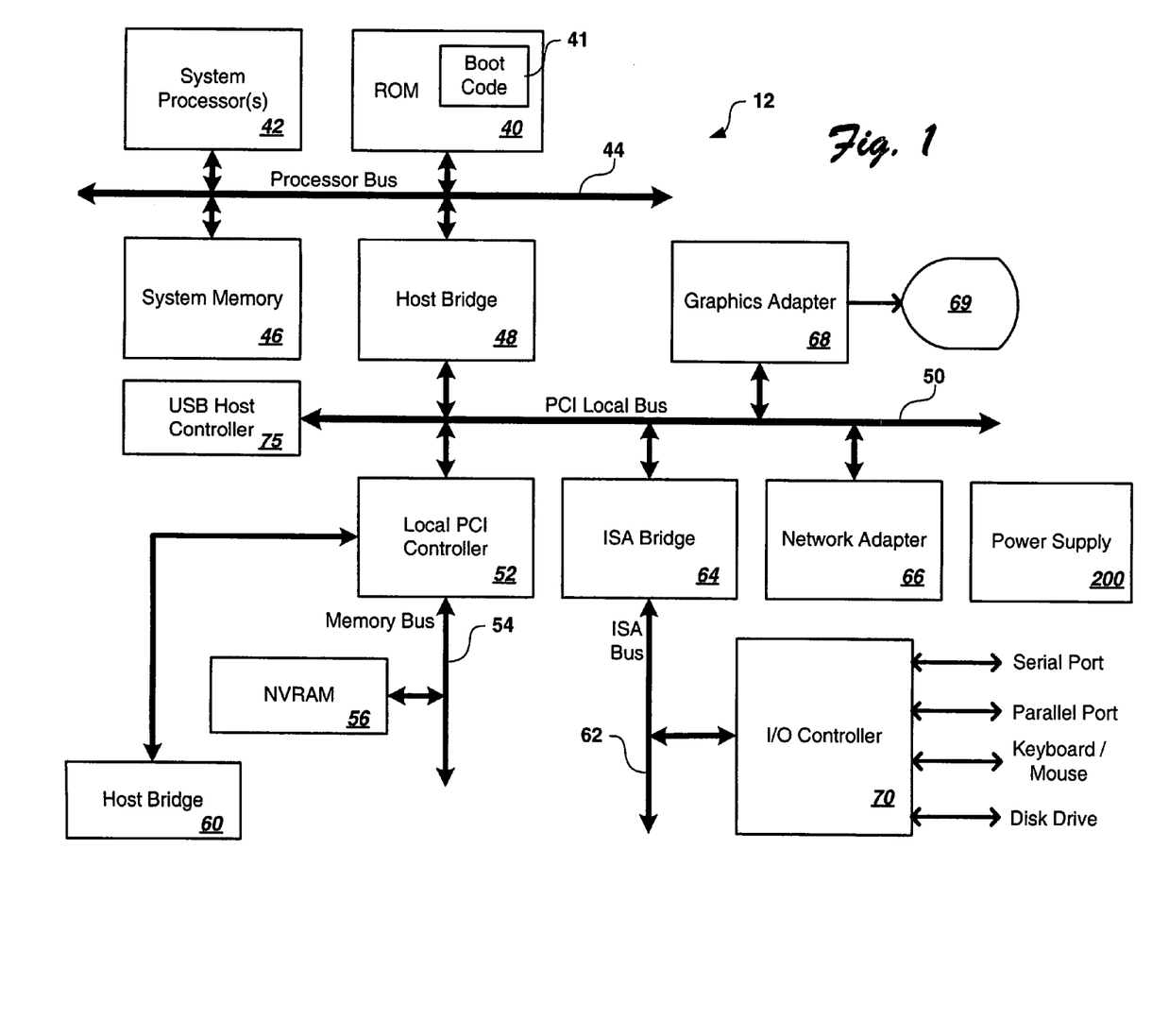
FIG. 1 is a block diagram of a computer system according to a preferred embodiment of the present invention which incorporates a power supply having in-circuit FET on-resistance characterization.

Referring now to FIG. 1, there is depicted a block diagram of an illustrative embodiment of a computer system 12 within enterprise computing environment 8. The illustrative embodiment depicted in FIG. 1 may be a desktop computer system, such as one of the Aptiva® series of personal computers, or a workstation computer, such as the RS/6000®, which are both manufactured by International Business Machines (IBM) Corporation of Armonk, N.Y.; however, as will become apparent from the following description, the present invention is applicable to the power conversion of any data processing system.

FIG. 1 is a block diagram of a computer system according to a preferred embodiment of the present invention which incorporates a power supply having in-circuit FET on-resistance characterization. As shown in FIG. 1, computer system 12 includes at least one system processor 42, which is coupled to a Read-Only Memory (ROM) 40 and a system memory 46 by a processor bus 44. System processor 42, which may comprise one of the PowerPC™ line of processors produced by IBM Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to LAN 10, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and disk drive (e.g., storage 14). In addition, I/O controller 70 supports external communication by computer system 12 via serial and parallel ports. Internal and external communications to and from system processor 42 are further provided by USB host controller 75.

Computer system 12 further includes power supply 200 which sources power to the load components of computer system 12 including system processor 42, system memory 46, and graphics controller 68. Power supply 200 is a switching type power supply which is capable of characterizing the on-resistance of its onboard power MOSFET while the system is in operation (in-circuit). Knowing the actual on-resistance of the output stage MOSFET in-circuit allows for the setting of over-current and under-current threshold values or trip points based on actual on-resistance values.

Figure 2:
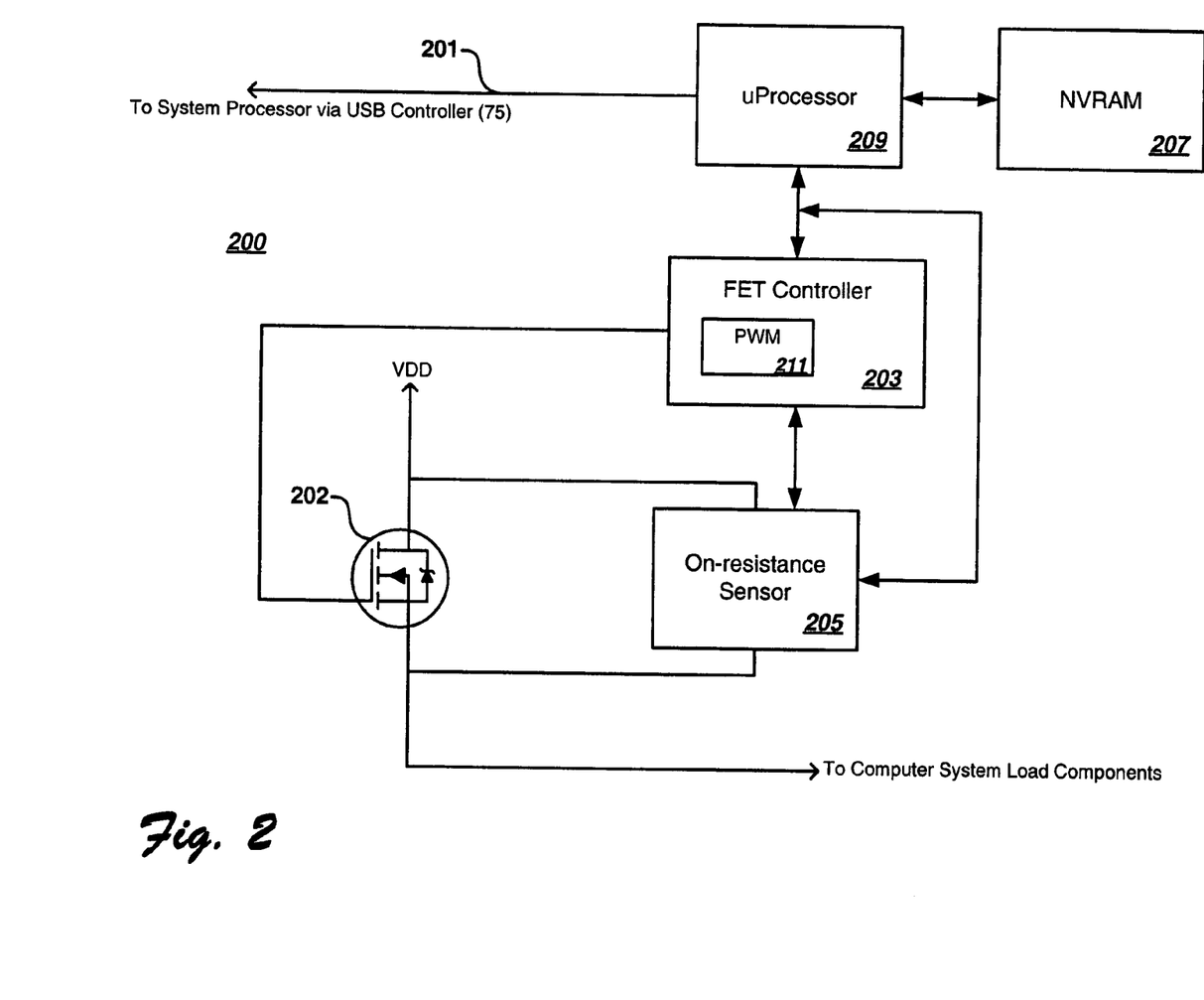
FIG. 2 is a block diagram showing a more detailed view of pertinent in-circuit FET on-resistance characterization circuits in a power supply configured according to one embodiment of the present invention.

FIG. 2 is a block diagram showing a more detailed view of pertinent in-circuit FET on-resistance characterization circuits in power supply 200. Power supply 200 includes a high current output MOSFET transistor 202. As shown in the embodiment of FIG. 2, MOSFET 202 is an n-channel silicon device which sources current to load components of computer system 12. While an n-channel silicon device is used in the present embodiment, other embodiments may use p-channel devices which sink current, or n-channel devices in other configurations to also sink current. Likewise, p-channel devices can be configured to source current as well.

MOSFET 202 is controlled by FET controller 203 which biases MOSFET 202 in a nearly fully-on/fully-off switch mode of operation. For the embodiment shown in FIG. 2, FET controller 203 regulates voltage using a pulse width modulation (PWM) technique. Low-level pulse width modulation control is provided by a standard pulse width modulation controller 211, the construction and operation of which is well known in the industry and are available from sources such as Unitrode (at the time of this writing, Unitrode products were available from Texas Instruments). Although pulse width modulation is used in example of FIG. 2, other modulation techniques can also be used, such as synchronous modulation in DC to DC applications.

On-resistance sensor 205 measures the on-resistance of MOSFET 202 while the computer system operates in its normal mode of operation, i.e., in-circuit. Construction and operational details of on-resistance sensor 205 are shown in described in co-pending, commonly assigned, application Ser. No. 10/855,122 having common inventorship, filed May 27, 2004, and entitled "Apparatus Having In-circuit FET On-resistance Characterization." This related application is hereby incorporated by reference herein in its entirety.

FET controller 203 and on-resistance sensor 205 operate under the control of microprocessor 209 which implements the logic to be described relative to the flowcharts in the figures which follow. Microprocessor 209 has NVRAM 207 at its disposal for storing on-resistance values and other parameters across power-on power-off cycles of the computer system. As will be seen, values stored in NVRAM 207 include values which are used to establish baseline on-resistance values and other values for particular FETs installed in the system for an initial computer system configuration and for subsequent predictive failure conditions. Values include initial on-resistance values measured for the MOSFET 202 while in use at the time the system and/or the MOSFET was initially configured, or presumed initial values; and values which deviate from the initial on-resistance values and for which a predictive failure report is to be generated.

MOSFET 202 is a silcon device. Although silcon is used in the embodiment of FIG. 2, GaAs or other semiconductor technologies may be used. Initial on-resistance values stored in NVRAM 207 and threshold on-resistance values for which predictive failure reports are to be generated, therefore, are specific to silcon or GaAs or any other technology is used, and/or maybe specific to the actual part used.

Microprocessor 209 communicates with on-resistance sensor 205 and and determines if MOSFET 202 is likely to fail or has already failed. As will be seen, this is accomplished by monitoring the on-resistance of MOSFET 202 over time. The time over which the on-resistance is measured is preferably over the life of the part. However, should NVRAM 207 fail for any reason, as in for example due to a depleted battery, MOSFET 202 is re-characterized when it is determined that characterization data has been lost. Initial on-resistance measurements are preferably taken at the time computer system 12 is manufactured/first configured. If MOSFET 202 is replaced at some point in time after the initial manufacturing and/or configuration of computer system 12, the newly replaced MOSFET is then characterized for on-resistance and the value of the on-resistance is stored in NVRAM 207 and the older value discarded or overwritten in the process. In this way, the embodiment performs failure analysis and isolation/protection. Further operational details will be given during the description of the flowcharts.

The present invention is not limited to embodiments having a fixed initial on-resistance measurement which is the earliest measurement taken for a given device. Nor is it limited to embodiments having fixed predetermined thresholds for generating predictive failure analysis reports. Although the preferred embodiment uses fixed initial on-resistance measurements and thresholds, the present invention also encompasses embodiments which compare currently measured values against reference on-resistance measurements which are purposely taken after computer system 12 has been manufactured/configured. Indeed, the apparatus shown in the depicted embodiment contains the appropriate infrastructure to optionally and hypothetically operate in this non-fixed mode. This non-fixed mode may be useful, for example, for devices whose failure modes are best characterized by analyzing the rate at which the on-resistance is changing, rather than an absolute value from an earliest initial date. That is, a hypothetical device may have a relatively unstable on-resistance characteristic in absolute terms for most of its life and exhibit a pre-failure characteristic which is best measured in more relative terms. For example, if at any given temperature and humidity on any single day a device exhibits a predetermined delta on-resistance excursion within a specified period of time, this can be considered to be the pre-failure characteristic for which a predictive failure report is generated to computer system 12. In this non-limiting hypothetical example, the "initial" on-resistance measurement used as the reference for comparison can be recharacterized on a daily basis. It is worthy to note, however, that the fixed implementations shown and described in the figures are best known mode.

Measurements by on-resistance sensor 205 are correlated to the state of MOSFET 202 by comparing currently measured values to expected values of on-resistance. Although shown as separate devices, FET controller 203 and on-resistance sensor 205 can be combined into a single device (in other embodiments). Indeed, all components, except for MOSFET 202, are candidates for integration into a single integrated circuit in other embodiments.

The embodiment is able to operate in at least two modes: Absolute and Relative. A Relative mode is described in more detail in the description of FIGS. 3 and 4. An Absolute mode is described in more detail in the descriptions of FIGS. 5 and 6. In both modes, the gate of MOSFET 202 is fully biased before the on-resistance measurement is made by on-resistance sensor 205. However, on-resistance measurements can be made at any gate voltage as long as all measurements used for any particular comparison are made at the same gate voltage level. Use of the Absolute or Relative modes can be arbitrary. However, preferably, the Relative mode is used for technologies such as MOSFET technology where the on-resistance value is known to fluctuate significantly from one part to another; the Absolute mode is used for well-defined devices and technologies having stable on-resistance values.

Examples will be given below for allowable deviations/thresholds which are above the initial on-resistance value. Thresholds above the initial value cover conditions which include but are not limited to, for example, a contact degradation failure mode of MOSFET 202 itself. However, other failure modes are detectable which require allowable deviations/thresholds which are below the initial on-resistance value measured for MOSFET 202. A junction spiking form of contact migration is one such failure mode which causes a short circuit and for which allowable deviations/thresholds below the initial on-resistance value are set. The depicted embodiment contains the necessary infrastructure to detect either type of error. However, logic flow diagrams for examples which include thresholds below the initial on-resistance value are analogous to the below examples and are omitted as they are not needed to gain a full understanding of the present invention.

Figure 3:
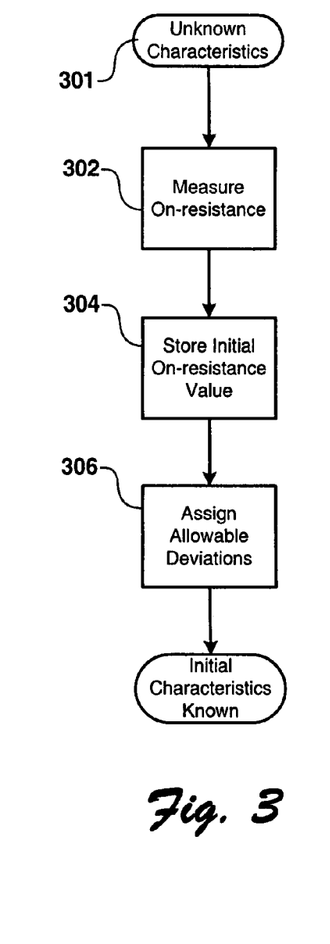
FIG. 3 is a logic flow diagram depicting logic executed in an embodiment of the present invention operating in a relative mode wherein the characteristics of an installed part is unknown.

FIG. 3 is a logic flow diagram depicting logic executed in an embodiment of the present invention operating in a relative mode wherein the on-resistance characteristics of MOSFET 202 is unknown. Referring now to FIG. 3 in conjunction to the previous figures, when the characteristics are unknown 301, microprocessor 209 initiates the process of determining MOSFET 202 characteristics and assigning allowable deviations. First, on-resistance measurements are taken 302 for MOSFET 202 using the normally biased values for MOSFET 202. Microprocessor 209 issues a command to FET controller 203 to initiate the on-resistance measurement of MOSFET 202. In response, FET controller 203 provides low-level control signals to enable resistance sensor 205 to initiate on-resistance measurement 302 of MOSFET 202. On-resistance sensor 205 includes an analog to digital converter which returns the measured on-resistance value directly to microprocessor 209 in digital format. Microprocessor 209 then stores 304 the measured value of on-resistance into NVRAM 207 as the initial on-resistance value. As previously described, this incidence in which characteristics are unknown 301 may occur either at manufacture and/or initial configuration of computer system 12 or at some later time for a variety of reasons including NVRAM 207 failure and replacement. This initial on-resistance value serves as the reference from which future comparisons are made.

Next, microprocessor 209 assigns 306 the allowable deviations from the initially stored on-resistance value. The allowable deviations are stored in NVRAM 207 as an immediate value which is to be compared against future measured values. The allowable deviations are absolute values specific to MOSFET 202 which are derived from predetermined relative values which are generic to MOSFET technology. For example, while a generic on-resistance value of a typical MOSFET is generally unknown and is expected to vary from part to part, once the initial on-resistance value of MOSFET 202 is known, two allowable deviations (thresholds) are assigned 306, one at 10 percent and another at 20 percent above the initial on-resistance value. These are stored in NVRAM 207 as the allowable deviations. In the preferred embodiment, the 10 percent and 20 percent deviation factors are stored in the ROM code of microprocessor 209. Processor 209 is socketed and can be interchanged along with MOSFET 202, accordingly, such that the ROM code corresponds to the MOSFET type. In other embodiments, the predetermined generic deviation factors can be stored in any other persistent memory and preferably not in NVRAM 207 where NVRAM 207 is a battery backed memory. In still other embodiments, the deviation factors can be installed via software executed from main processor 42 and communicated to microprocessor 209 through USB host controller 75 via sideband interface 201 (shown in FIG. 2). This software path can also be used in the preferred embodiment to override down level deviation factors stored in ROM or merely to avoid replacing processor 209 where MOSFET 202 is replaced with a slightly different type of device. With the allowable deviations assigned 306, the initial characteristics are known and normal operation 401 begins.

Figure 4:
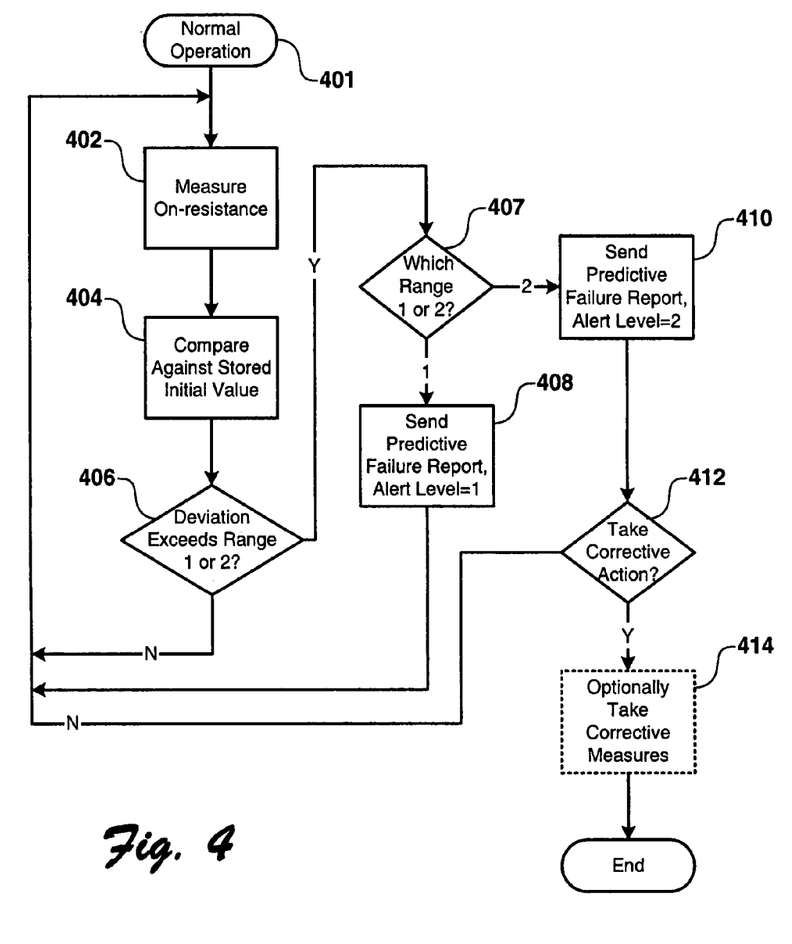
FIG. 4 is a logic flow diagram depicting logic executed in an embodiment of the present invention operating in a relative mode wherein the characteristics of an installed part is known and normal operation ensues.

FIG. 4 is a logic flow diagram depicting logic executed in an embodiment of the present invention operating in a relative mode wherein the characteristics of an installed part is known and normal operation ensues. In normal operation 401, the actual on-resistance of MOSFET 202 is measured 402 periodically at predetermined intervals. This measured value is then compared 404 against the stored initial on-resistance value. A determination 406 is then made as to whether the value measured 402 exceeds either of the allowable deviations (10% and 20%). If not, then processing continues by periodically measuring 402 the on-resistance. If it is determined 406 that either of the allowable deviations have been exceeded, a determination 407 is then made as to which of the two allowable deviations has been exceeded. If it is determined 407 that only the first deviation (10%) has been exceeded and not the second, a predictive failure report is sent 408 from microprocessor 209 to system processor 42 through sideband interface 201 with an alert level of "1." An alert level of "1" corresponds to a condition in which MOSFET 202 is out of spec but is still operational. Through this alert, a system administrator is informed that replacement parts should be ordered in anticipation of a potential failure of MOSFET 202.

Where it is determined 407 that both allowable deviations have been exceeded, a predictive failure report is sent 410 with an alert level of "2." An alert level of "2" corresponds to a severe condition for MOSFET 202. In response to such a severe condition, a decision 412 is then made as to whether to take corrective action. For example, if upon subsequent measurements 402 of MOSFET 202 it becomes apparent that the device is still operational but is well out of spec, a decision 412 can be made to take no corrective action. In which case, processing continues, after having sent the predictive failure report with an alert level of "2," by periodically measuring 402 the on-resistance.

Typically, however, a severity "2" condition requires corrective action in the one of several forms. If it is determined 412 that corrective action is needed, optional corrective measures are taken 414. For example, microprocessor 209 immediately issues a command to FET controller 203 to shut down MOSFET 202. The power burden is then shifted to other MOSFETs in the system. Since shifting the power burden may cause problems for the MOSFETs which remain operational, the corrective measures 414 include informing system processor 42 of such corrective action (assuming the system is still operational). With this information, computer system 12 can take corrective measures at a higher level to reduce the power burden of the remaining MOSFETs and thus maintaining the availability of the system. Alternatively, system processor 42 can issue a shut down signal to the operating system for an organized shut down of computer system 12. In a scenario where MOSFET 202 is the only, or only remaining, power device in the system, this corrective action immediately shuts down the computer system 12. This drastic action is beneficial in faster occurring events, such as a sudden low resistance that causes a thermal runaway which, if allowed to go unfettered, could damage other components in the system.

Figure 5:
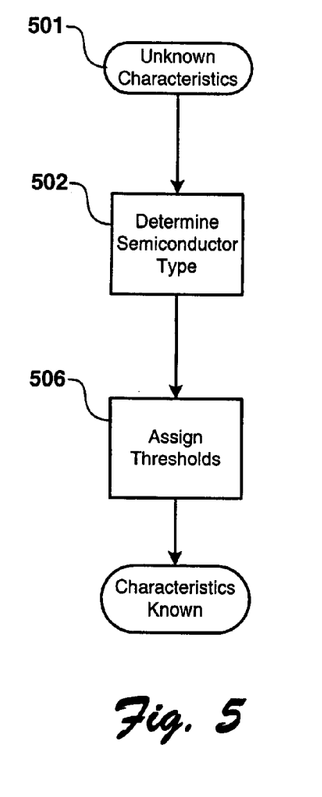
FIG. 5 is a logic flow diagram depicting logic executed in an embodiment of the present invention operating in an absolute mode wherein the characteristics of an installed part is unknown.

FIG. 5 is a logic flow diagram depicting logic executed in an embodiment of the present invention operating in an absolute mode wherein the characteristics of an installed part is unknown. Upon a system initialization where microprocessor 209 is unable to determine the characteristics 501 of MOSFET 202, as in the example of FIG. 3, due to a new configuration or NVRAM 207 malfunction, microprocessor 209 references a hard-coded variable in its ROM code which identifies the semiconductor type and in so doing determines 502 the device type. Alternatively, the device type can be provided in software by system processor 42. Once the device type has been determined 502, microprocessor 209 refers to a table, also hard coded into its ROM, and reads absolute value thresholds which correspond to the determined 502 semiconductor type and stores these values in NVRAM 207 as the thresholds which, if exceeded, will trigger the predictive failure analysis reports and other actions to be described in relation with FIG. 6. A flag is set indicating that the characteristics of MOSFET 202 are known and thus the processing beginning at 501 may be bypassed in future instances.

Figure 6:
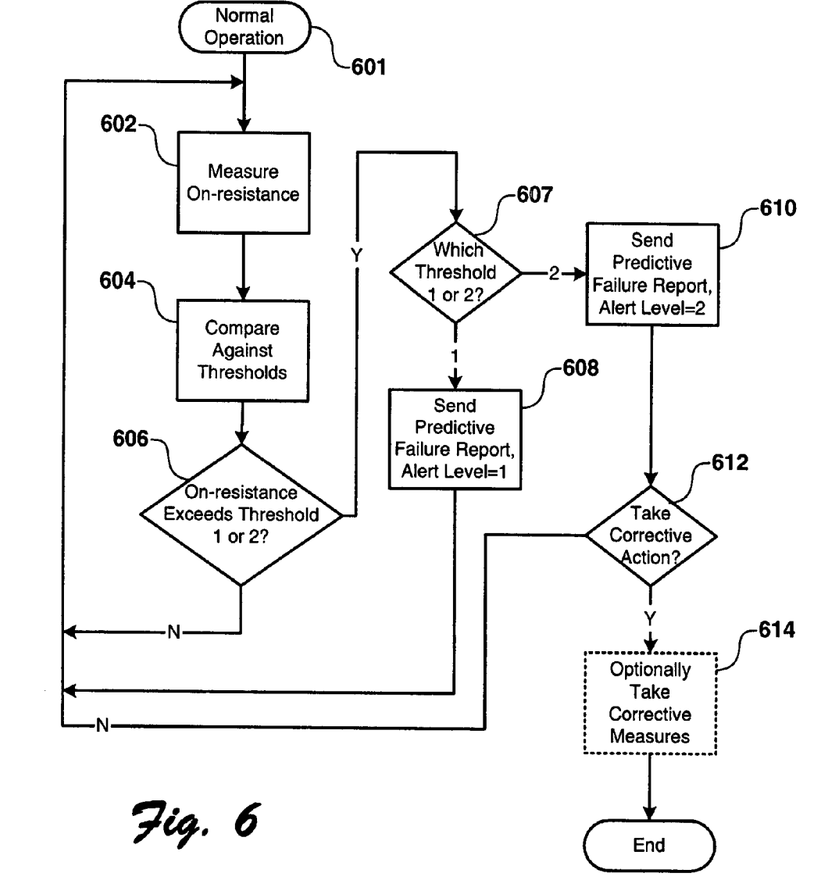
FIG. 6 is a logic flow diagram depicting logic executed in an embodiment of the present invention operating in an absolute mode wherein the characteristics of an installed part is known and normal operation ensues.

FIG. 6 is a logic flow diagram depicting logic executed in an embodiment of the present invention operating in an absolute mode wherein the characteristics of an installed part is known and normal operation ensues. With normal operation 601 in the absolute mode, on-resistance values are periodically measured 602 as in the example shown in FIG. 4. Here, the on-resistance values measured 602 are compared 604 against the thresholds stored in NVRAM 207 as per the threshold assignment 506 of FIG. 5. A determination 606 is then made as to whether the on-resistance measured 602 exceeds either or both of the thresholds. If not, processing continues with the periodic on-resistance measurement 602. If it is determined 606 that either or both of the thresholds have been exceeded, a determination 607 is then made as to whether the first threshold is exceeded or other both thresholds are exceeded. In the case where it is determined 607 that only the first threshold has been exceeded, a predictive failure report is sent 608 using an alert level of "1." This alert level is treated in the same manner as the example described relative to FIG. 4. Where a determination 607 is made that both thresholds have been exceeded, a predictive failure report to it is sent 610 using an alert level of "2," as described in the example of FIG. 4. Determinations 612 and corrective measures 614 are made and/or taken in the manner described with respect to FIG. 4.

Embodiments of the present invention include various functions, which have been described above. The functions may be performed by hardware components or may be embodied in machine-executable instructions as firmware or software, which may be used to cause a general-purpose or special-purpose processor programmed with the instructions to perform the functions. Alternatively, the functions may be performed by a combination of hardware, firmware and software.

For example, in one embodiment, microprocessor 209 and NVRAM 207 are eliminated and replaced by system processor 42 and system NVRAM 56 to perform the same functions. In this embodiment, on-resistance sensor 205 comprises a USB interface for direct communication to system processor 42 through interface 201. The functions of microprocessor 209 are executed as software instructions from system processor 42 with reference to data stored in system NVRAM 56.

In the drawings and specifications there has been set forth a preferred embodiment of the invention and, although specific terms are used, the description thus given uses terminology in a generic and descriptive sense only and not for purposes of limitation.

The invention claimed is:

1. Apparatus comprising:
   a processor having access to a non-volatile memory;
   a semiconductor having a measurable on-resistance while sourcing/sinking current to/from components of the apparatus; and
   a sensor which is coupled to said processor and said semiconductor and which measures the on-resistance of said semiconductor during normal operations of the apparatus;
   wherein, the processor is effective to:
   monitor the on-resistance of said semiconductor over a predetermined portion of the life of the semiconductor;
   predict that the semiconductor is likely to fail based on the monitoring; and
   report a predictive failure to the apparatus based on the prediction, wherein the prediction is made by comparing a recent on-resistance value to a stored on-resistance value and determining that the recent on-resistance value exceeds an allowable deviation from the stored on-resistance value which is stored in the non-volatile memory, wherein the recent, and stored, on-resistance values are produced by the monitoring.

2. Apparatus of claim 1 wherein the prediction is made by comparing a measured value, which is a function of the measured value of on-resistance, to a stored value which is stored in the non-volatile memory, the stored value being related to generic on-resistance characteristics.

3. Apparatus of claim 1 wherein the stored on-resistance value is the earliest value of on-resistance stored which corresponds to said semiconductor.

4. Apparatus of claim 1 wherein the reporting includes reporting a plurality of predictive failures based on a plurality of allowable deviations from the stored on-resistance value.

5. Apparatus of claim 4 wherein the plurality of predictive failures include a warning level reported in response to exceeding a first allowable deviation, and a shutdown level reported in response to exceeding a second allowable deviation which is greater than the first allowable deviation wherein the shutdown level is accompanied by a disablement of a circuit in the apparatus.

6. Apparatus of claim 1 wherein the prediction is made by comparing a recent on-resistance value to a predetermined threshold and determining that the recent on-resistance value exceeds the predetermined threshold, wherein the recent on-resistance value is produced by the monitoring.

7. Apparatus of claim 6 wherein the reporting includes reporting a plurality of predictive failures based on a plurality of predetermined thresholds.

8. Apparatus of claim 7 wherein the plurality of predictive failures include a warning level reported in response to exceeding a first threshold, and a shutdown level reported in response to exceeding a second threshold which is greater than the first threshold wherein the shutdown level is accompanied by a disablement of a circuit in the apparatus.

9. Apparatus of claim 1 wherein the predetermined portion of the life of the semiconductor corresponds to the time between the earliest installation of the semiconductor into the apparatus and the time which corresponds to the currently measured on-resistance value.

10. A method comprising:
    monitoring the on-resistance of a semiconductor over a predetermined portion of the life of the semiconductor, wherein the semiconductor is a semiconductor which sources/sinks current to/from components of an apparatus and wherein the on-resistance is measured in-circuit during normal operations of the apparatus;
    predicting that the semiconductor is likely to fail based on said monitoring; and
    reporting a predictive failure to a user based on said prediction, wherein said prediction is made by comparing a recent on-resistance value to a stored on-resistance value and determining that the recent on-resistance value exceeds an allowable deviation from the stored on-resistance value, wherein the recent, and stored, on-resistance values are produced by said monitoring.

11. A method of claim 10 wherein the stored on-resistance value is the earliest value of on-resistance stored which corresponds to the semiconductor.

12. A method of claim 10 wherein said reporting includes reporting a plurality of predictive failures based on a plurality of allowable deviations from the stored on-resistance value.

13. A method of claim 12 wherein the plurality of predictive failures include a warning level reported in response to exceeding a first allowable deviation, and a shutdown level reported in response to exceeding a second allowable deviation which is greater than the first allowable deviation wherein the shutdown level is accompanied by a disablement of a circuit in the apparatus.

14. A method of claim 10 wherein said prediction is made by comparing a recent on-resistance value to a predetermined threshold and determining that the recent on-resistance value exceeds the predetermined threshold, wherein the recent on-resistance value is produced by said monitoring.

15. A method of claim 14 wherein said reporting includes reporting a plurality of predictive failures based on a plurality of predetermined thresholds.

16. A method of claim 15 wherein the plurality of predictive failures include a warning level reported in response to exceeding a first threshold, and a shutdown level reported in response to exceeding a second threshold which is greater than the first threshold wherein the shutdown level is accompanied by a disablement of a circuit in the apparatus.

17. A method of claim 10 wherein the predetermined portion of the life of the semiconductor corresponds to the time between the earliest installation of the semiconductor into the apparatus and the time which corresponds to the currently measured on-resistance value.

* * * * *